Sept. 8, 1942.　　　D. B. STEINMAN　　　2,295,243
STEREO MOTION PICTURE VIEWER
Filed Dec. 12, 1940　　　3 Sheets-Sheet 1
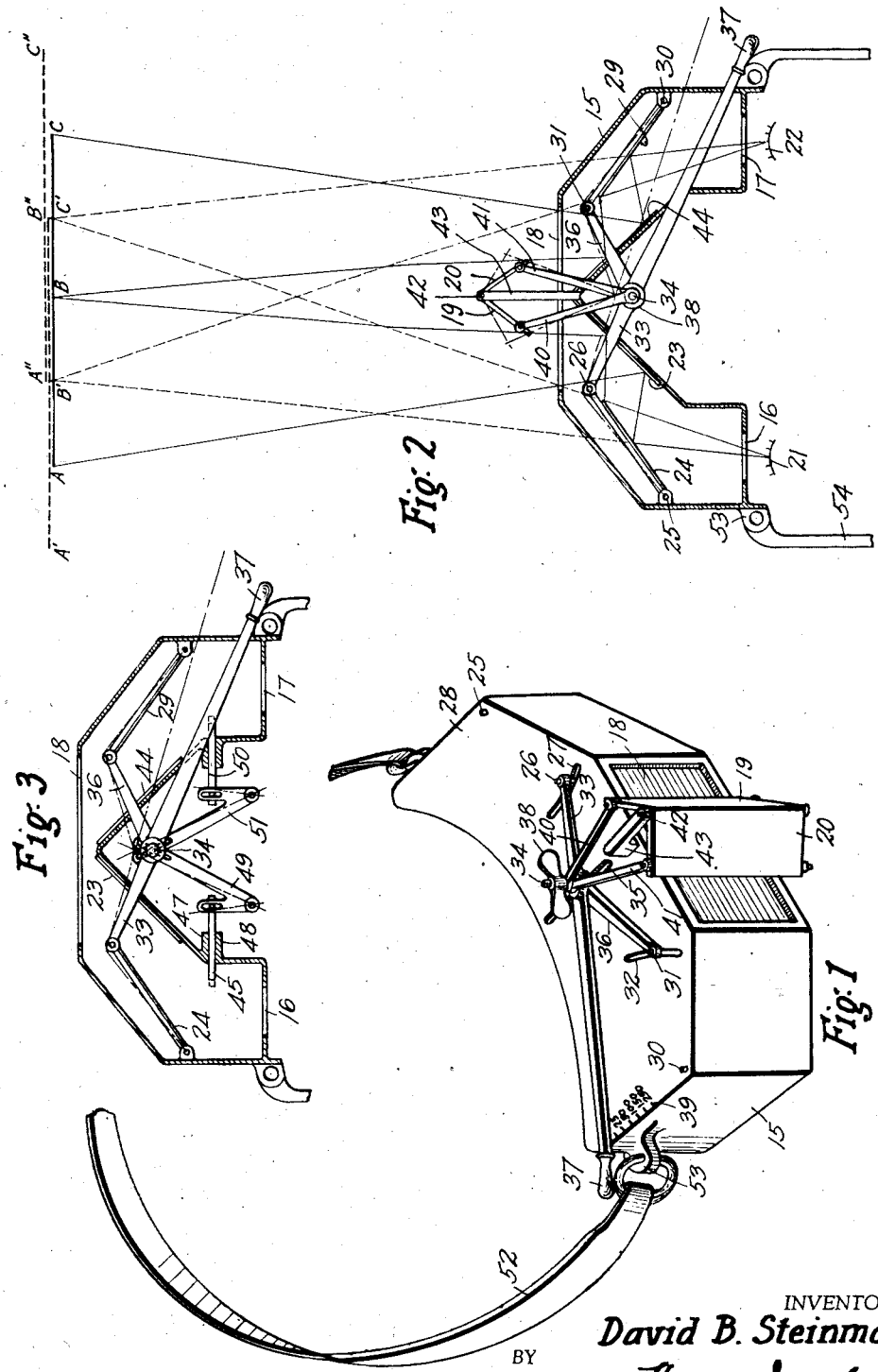
INVENTOR.
David B. Steinman
BY
Harry Jacobson
ATTORNEY Sept. 8, 1942.    D. B. STEINMAN    2,295,243
STEREO MOTION PICTURE VIEWER
Filed Dec. 12, 1940    3 Sheets-Sheet 2
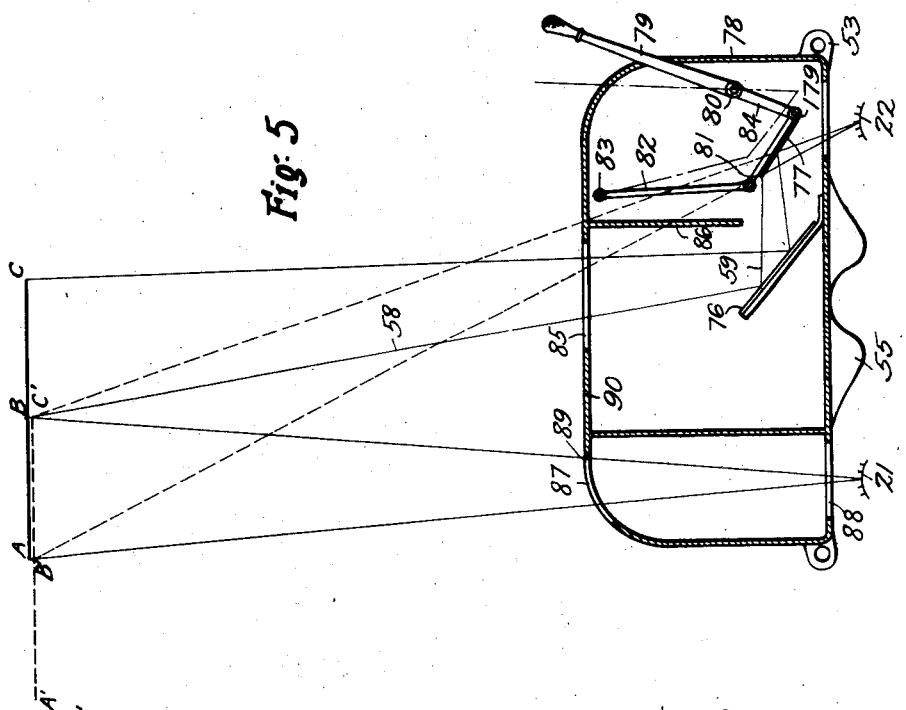
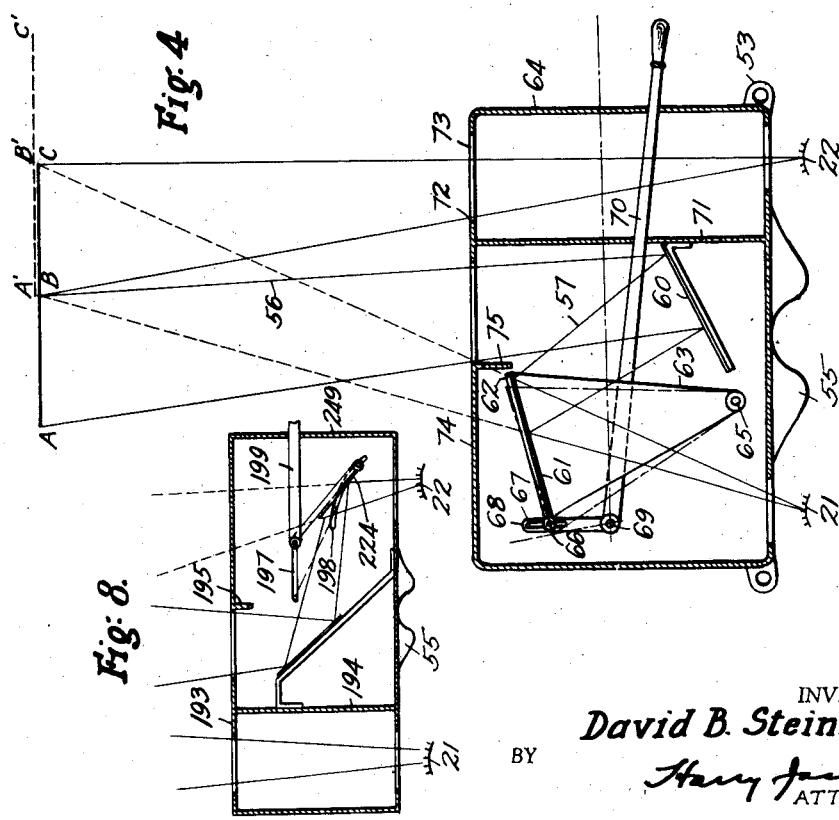
INVENTOR.
David B. Steinman
BY
　　　　　　ATTORNEY Sept. 8, 1942.　　　D. B. STEINMAN　　　2,295,243
STEREO MOTION PICTURE VIEWER
Filed Dec. 12, 1940　　　3 Sheets-Sheet 3
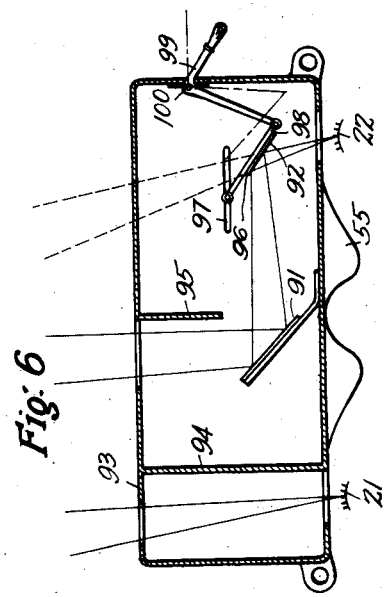
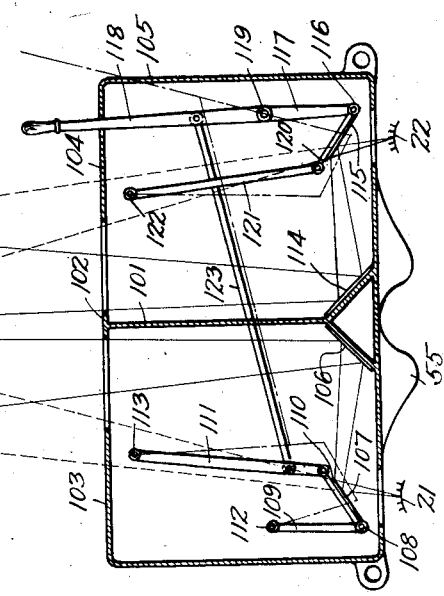
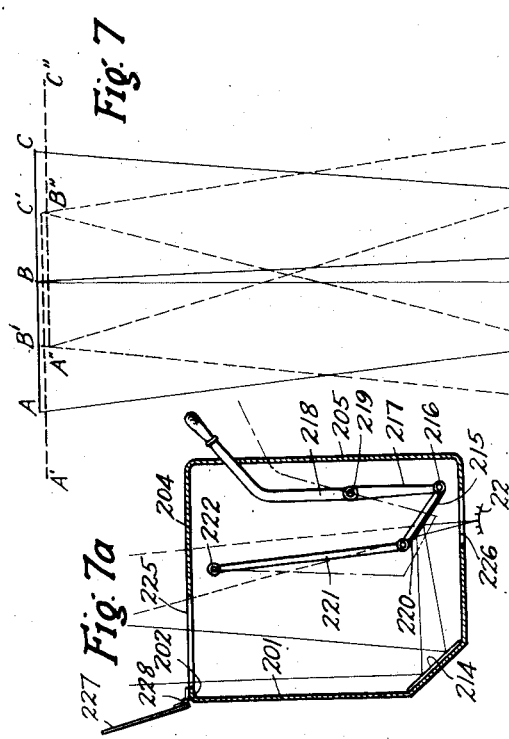
INVENTOR.
David B. Steinman
BY
ATTORNEY

UNITED STATES PATENT OFFICE 2,295,243

STEREO MOTION PICTURE VIEWER

David B. Steinman, New York, N. Y.

Application December 12, 1940, Serial No. 369,770

18 Claims. (Cl. 88—16.6)

This invention relates to devices known as "viewers" for the use of observers such as the persons in an audience for viewing stereo pictures to obtain stereopsis and particularly for viewing twin stereo pictures which have been projected on a screen or the like in non-coincident relation and preferably in side by side or contiguous relation or in any desired laterally spaced relation.

In what follows, no distinction will be made between pictures of a single tint or color, commonly known as "black and white" pictures and multicolored pictures generally referred to as "colored" pictures. Nor will any distinction be made between "still" pictures and "moving" pictures since my device is adapted for the viewing of any of the types of pictures above-mentioned provided that the twin pictures are not superimposed or overlapped upon each other on the screen or other viewing surface.

Present methods of viewing projected stereo pictures necessitate the projection of the pictures through light polarizing filters, that is, filters which will polarize the light from each of the twin pictures in a different direction, and also necessitate the viewing of the thus projected pictures through matched "polarized" spectacles; or else the pictures are projected through colored or other filters and the projected pictures are viewed through matched colored spectacles or other filters used by each observer. Commonly, the twin pictures projected by such methods are superimposed upon each other and dependence is had upon the elimination of one of the pictures from each eye by means of the system of specific filters used so that each eye sees only one of the projected twin pictures.

Such methods of viewing the projected pictures have numerous disadvantages or limitations. They involve an unduly large loss or absorption of light by the filtering systems, thereby requiring substantial increase in the power of the projection lamps or lighting means and necessitating the use of blower of other cooling systems for the projector, together with heat-absorbing units to safeguard the film or the like from fire hazard. Because of the limitations in the amount of light available to illuminate the picture, the size of the projected picture must be substantially reduced so as to concentrate available light on a comparatively small area. Such systems also are limited to projection screens of special construction provided with non-depolarizing material or other peculiar surface treatment not used with ordinary screens. Furthermore, they limit the seating area for the audience to a comparatively narrow angle band directly in front of the screen to avoid loss of polarization at the wider lateral angles. Other disadvantages and limitations of such methods are well known to those skilled in the art and need here not be set forth in detail.

My invention contemplates the elimination of the disadvantages and limitations above-referred to by the provision of a viewing device to be used by each member of the audience, which device is effective to produce stereopsis of the desired degree without the use of polarizing or other filters and without material loss of illumination; the device being usable for efficient viewing of projected twin stereo pictures whether of the black and white type or the colored type or whether of the still type or moving picture type; the device permitting the projection of the pictures by the standard or conventional projector and other standard means customarily used for that purpose including the conventional and standard projecting lamp, screen and seating arrangement used for "flat" projection as distinguished from "stereo" projection, the device obviating the necessity for the use of any stereo attachment on the projector.

My invention further contemplates the provision of an individual viewer excluding from the field of vision the unwanted non-stereo side images otherwise accompanying the unfiltered viewing of projected stereo pictures, said viewer including a combination of light deflectors and masks.

My invention further contemplates the provision of an adjustable viewer in which either the masks or the light deflecting means are adjustable to accommodate the viewer to the particular distance of the observer from the screen or the particular angular position of the observer relatively to the screen and also to adjust for the relative size and spacing of the stereo pictures on the screen and for individual ocular reactions and adjustments of the user in obtaining stereopsis.

My invention further contemplates the provision of movable light deflectors and of means for so moving such deflectors as to give them a combined motion of translation and rotation, whereby movable screens or masks on the viewer are rendered unnecessary and the field of view is accurately limited to the area of the fused stereo image.

My invention further contemplates the provision of a viewer adapted for use at any distance from a screen and in any position relatively thereto for viewing non-overlapping plain, colored, still or moving stereo pictures projected on the screen for viewing by a plurality of persons by any method and by standard projecting apparatus; my invention also contemplates the provision of a method for projecting and viewing such pictures, which method permits the pictures on the screen to be clearly enjoyed as non-stereo pictures by any persons in the audience who may be without viewers, who wish to put down their viewers temporarily, who have defective or missing vision in one eye, or who have some ocular-neuro defect preventing stereopsis. Other systems of projection stereoscopy require superposition of the twin projected pictures on the same area of the screen, thereby preventing enjoyment of the pictures as non-stereo pictures by any individuals in the audience. Said method also permits each individual user, at will, to obtain effects of "hyper-stereo" or exaggerated stereo, bringing the subjects of the picture nearer to the spectator. This is accomplished by moving the adjustment somewhat beyond initial fusion of the images, that is by moving the two images from their original separation into superposition and them somewhat beyond such superposition. In other systems of projection stereoscopy, any desired effects of "hyper-stereo" must be obtained in the original taking of the pictures, or by cutting and shifting the halves of the stereo film, or by an adjustable stereo attachment on the projector. Such methods do not permit individual control of hyper-stereo effects by individuals in the audience to suit their own preference or their own limitations of stereopsis.

If the stereo photographs have been taken with too much hyper-stereo, or with too much hypo-stereo, audiences are unable to obtain stereopsis in methods of stereoscopy using screen superposition.

My invention further contemplates the provision of a comparatively simple and comparatively inexpensive viewer for non-overlapping stereo pictures capable of adjustment to compensate for the varying conditions of use likely to be met in ordinary commercial, theatrical or amateur projection of black and white, colored, still or motion pictures of the stereo or flat type.

The various objects of the invention will be clear from the description which follows and from the drawings, in which, Fig. 1 is a perspective view of my new viewer, wherein a pair of adjustable coupled optical systems are provided, one for each eye of the user.

Fig. 2 is a top plan view of the same with the top cover of the device removed to show the interior light deflectors and to show also the path of the light rays from the projected pictures toward each eye as well as the selection and fusing of the stereo picture images and the elimination of the unwanted side images. In this figure, I have shown by dash-dot lines, the center lines of the adjusted positions of the adjustable mirrors, interceptors and levers.

Fig. 3 is a similar fragmentary view of a slightly modified form of the coupled interceptors or masks.

Fig. 4 is a similar view of a modified form of the invention, wherein an adjustable optical system is used for one eye only and one form of the means for imparting a combined motion of translation and rotation to the adjustable light deflector is shown.

Fig. 5 is a similar view of another modified form of the same.

Fig. 6 is a similar view of still another modified form of the same.

Fig. 7 is a similar view of another modified form of the invention, wherein fixed interceptors or masks are used and an adjustable optical system provided for each eye.

Fig. 7a is a similar view of a monocular viewer for the use of one eye of the observer, the other eye being left bare.

Fig. 8 is a top plan view of another form of my viewer with the cover thereof removed and showing slots for guiding the adjustable mirror in a predetermined path of combined rotation and translation.

It will be understood that none of the drawings are made to scale, and that the dimensions and spacing of the parts for efficient operation may be readily computed by those skilled in the art in view of the present disclosure.

In what follows, I have disclosed the twin stereo pictures AB, BC, projected on a screen of the usual or conventional type in side by side relation with the adjacent edges thereof coincident at B. It will be understood, however, that the twin stereo pictures may be separated, if desired, by any convenient amount or that they may be projected on screens which are separated or are arranged in any desired angular relationship for convenient viewing by an audience. In any case, the twin stereo pictures whether black and white or colored and whether of the still or moving picture type may have been taken in any appropriate manner and by means of a double camera, a double lens camera, a two vision camera, a stereo attachment on the camera, or any other means designated for that purpose, said twin pictures being arranged on the film in the customary manner as in side by side relation or in laterally spaced relation, as desired.

In general, my new viewer is an eye piece apparatus or instrument preferably in the form either of enclosed light deflectors combined with interceptors or in the form of open spectacles similarly provided with light deflectors and interceptors. The instrument is used by each individual spectator in the audience for viewing the twin juxtaposed or separated stereo pictures on the screen or screens so as to obtain the full stereoscopic effect, or a hypo-stereo or hyper-stereo effect. The viewer may be held in the hand for long periods without undue fatigue or it may be supported on the head by means of elastic bands or the like or temples or the like. Those in the audience who are without viewers or who do not wish to use them can view the projected pictures without blur and without stereopsis. I have found that audiences using my method of viewing and my viewer are not subject to the eye strain and fatigue produced by prolonged use of viewing methods and devices using polarized light.

Light deflecting means in the form of mirrors, are provided and are made adjustable to permit variation of the relative angular positions of the reflectors or deflectors. Such adjustability of the optical unit permits the device to be used regardless of variations in the individual ocular reactions of different observers or of the position of the observer relatively to the screen or of the relative size or spacing of the stereo pictures on the screen. In the cases where two optical systems are used, one for each eye, both systems are made adjustable and are coupled together for simultaneous or approximately matched or synchronized movement to be operated by a single adjustment control, thereby securing substantially equal and symmetrical angular change of the line of vision for the two eyes.

Referring now particularly to that form of the invention shown in Figs. 1 and 2, I have there illustrated a viewer having a pair of similar optical systems, one for each eye, and arranged within the casing 15 which is provided with the eye openings 16 and 17 and with the viewer opening 18. Said opening 18 is partly obstructed by the adjustable opaque vanes or light interceptors 19 and 20, the interceptor 19 being operative for the eye 21, while the interceptor 20 is operative for the eye 22. Arranged to receive the rays from the picture AB is the reflector 23, said reflector reflecting the rays to the movable reflector 24 which is pivoted to the casing 15 as by means of the pin 25 at one end thereof or at one end of its holder. The other end of the reflector or its holder is supported by the pin 26 passing through the slot 27 in the top wall 28 of the casing.

It will be noted that the outer edge of the interceptor 19 is on the line of the ray from the median line B of the picture to the fixed reflector 23, whereby all rays to the right of the point B are excluded from the field of view of the eye 21. The relative lengths of the reflectors 23, 24, their relative angular positions and the spacing therebetween are such as to limit the field of vision of the eye 21 to the picture area AB. Similarly, all the rays to the left of the line B are excluded by the interceptor 20, from the field of vision of the eye 22, such exclusion being aided by the sizes and arrangement of the reflectors 29 and 44. The adjustable reflector 29 for the eye 22 is pivoted at 30 to the casing 15 and is supported along its outer edge by the pin 31 operating in the slot 32 in the casing cover 28. The adjustable mirrors 24 and 29 are coupled together for simultaneous and symmetrical movement relatively to the middle line of the viewer between the eye openings. This is accomplished by the lever 33 which is pivoted at one end on the pin 26 and also on the screw 34, passing through the slot 35 (Fig. 1) in the cover 28 and movable therein. The similar lever or link 36 is pivoted at one end on the pin 31 and at its other end on the screw 34. The levers 33 and 36 thereby constitute a toggle connection between the reflectors 24 and 29 to swing them about their pivots simultaneously and symmetrically and thereby to adjust the two optical systems simultaneously. Preferably, the lever 33 is extended past the screw 34 and terminates in the handle 37 by means of which the toggle joint may be manipulated on the loosening of the clamping nut 38. A scale as 39 is provided on the casing top 28 to indicate the various positions into which the lever handle 37 may be shifted to compensate for varying distances of the observer from the screen or varying picture sizes or spacing.

To shift the interceptors 19 and 20 correspondingly to the shifting or adjustment of the movable reflectors, a lever or link as 40 mounted on one of its ends on the screw 34 and pivoted at its other end to the outer part of the vane 19, is provided. Similarly, the lever or link 41 is provided, by means of which to adjust the interceptor vane 20 on movement of the screw 34. The inner or adjacent edges of said vanes 19 and 20 are pivoted as at 42 on the fixed arm 43 projecting from the casing top 28. Consequently, when the lever handle 37 is adjusted, the vanes are simultaneously adjusted so that no part of any image on the screen to the right of the point B may reach the eye 21 and no part of any image to the left of the point B may reach the eye 22. Without the use of the vanes or interceptors, each eye would see the two projected stereo pictures AB and BC. When, with the aid of the optical system, the left and right eye views are relatively shifted toward each other to produce optical coincidence or fusion of one pair of complementary images, the eye 21 seeing the picture AB at A"B" and the eye 22 seeing the picture BC at B'C' (Fig. 2), a total of three images would be seen in a row, the middle one being the fused stereo picture consisting of the images A"B" and B'C' combined to produce stereopsis, and the two outside pictures, namely, A'B' and B"C" being an unpaired set of non-stereo side pictures. The presence of these unwanted non-stereo images in the field of vision would be distracting if they were not eliminated, but said images have been eliminated by means of the interceptors 19, 20.

The dash-dot lines of Fig. 2 illustrate an adjusted position of the center lines of the various moving parts and of the operating means therefor. Such adjustment is made for projected pictures that are smaller or more distant as indicated by the scale 39. That is, the smaller pictures or pictures projected on a more distant screen subtend a smaller angle at the viewer and hence the mirrors as well as the interceptors must be swung away from each other or outwardly about their respective pivots to compensate therefor. Similarly, for nearer or larger pictures, the free ends of the mirrors and interceptors are swung toward each other or inwardly, since such pictures subtend a larger angle.

As shown in Fig. 3, the interceptors may be operated and arranged differently from those shown in Figs. 1 and 2. For example, the interceptor 45 may be arranged to slide between the spaced guides 47, 48, said interceptor being operated by the crank 49 pivoted at one end to the interceptor and at its other end to the screw 34 which is slidable in the slot 35 of the cover 28 as has been explained in connection with Figs. 1 and 2. The interceptor 50 for the other eye may be similarly operated by the crank 51 and may similarly slide between suitable guides for operation simultaneously with the adjustment of the adjustable reflectors. The cranks 49 and 51 are pivoted intermediate their ends to the top of the casing. It will be noted that while I have referred to the members 23, 24, 44 and 29 as reflectors, any light deflecting means such as prisms or the like may be used to replace them in a manner which is well understood in the art and hence need not be further shown or described. It will also be understood that suitable means may be provided if desired to retain the viewer in place before the eyes of the user. Said means may take the form of an elastic or otherwise adjustable head band 52 (Fig. 1) secured by rings or the like to suitable lugs as 53 on the casing 15, or the supporting means may take the form of temples such as spectacle temples 54 pivoted on the lugs 53 and adapted to engage behind the ears of the user in a manner which is well understood. I have found that the viewer may be held manually before the eyes for long periods without fatigue and without eye strain so that the head band and temples may be omitted if desired.

The bottom of the casing (Figs. 4, 5, 6, 7 and 8) may be shaped to provide the nose piece 55 provided with a recess to receive the bridge of the nose and to center the device properly as well as to permit the top 28 to rest against the forehead, or if desired, the bottom of the casing may be cut away (Figs. 2 and 3) to lighten the viewer as much as possible.

As has been hereinbefore indicated, I may dispense with movable interceptors by giving the adjustable reflectors themselves a peculiar motion of combined translation and rotation so as to limit the field of view accurately to that width of the viewing surface between the lateral margins of the fused stereo image. A practical embodiment of a viewer having such interceptors and reflectors is illustrated diagrammatically in Fig. 4, wherein only two reflectors, one a fixed reflector 60 and the other a movable reflector 61 are employed in a single optical system for one eye 21. The movable reflector is pivoted so that its end 62 travels when adjusted in an arcuate path having a long radius which sufficiently approximates a straight line motion to give the mirror the equivalent of a movement of translation. Said mirror 61 is therefore supported by means of a comparatively long triangular link 63 pivoted to the casing 64 as at 65. The end edge 66 of the movable reflector or its support is provided with a pin movable in the slot 67 of the arm 68 which is pivoted to the casing as at 69 and which is swung about its pivot by means of the arm 70.

It will be understood that the arms 68 and 70 as well as the link 63 may if desired be arranged on the outside of the casing 64 as is shown for example in connection with the various levers and links of Fig. 1. The end 66 of the movable mirror is swung about the pivot 65 and consequently moves along an arcuate path of comparatively long radius while the end 62 of the mirror moves in the same path. The mirror is thereby given an orbital motion about the distant axis 65, or in other words is given a combined motion of translation and rotation on the operation of the arm 70.

The transverse partition 71 cooperates with the critical edge 72 of the sight opening 73 to act as a fixed interceptor to limit the left edge of the field of vision for the eye 22 to the picture BC, the picture AB not being visible to the eye 22 and therefore there being no unwanted or side image of said picture AB. The eye 21, by reason of the partitions 74 and 75 is prevented from seeing any part of the projected pictures except that part AB which is reflected by the mirror 61. The picture AB is therefore seen by the eye 21 in the position A'B' superimposed upon the undeviated picture BC seen by the eye 22, thereby producing fusion or stereopsis. The end edge 62 of the mirror 61 is positioned on the line of the light ray 56—57 reflected by the mirror 60 from the point B so that no light rays coming from BC can be reflected by the mirrors 60 and 61 to reach the eye 21. The non-stereo virtual image B'C' which would otherwise be produced is thus excluded from the field of vision of the eye 21.

It will be understood that a scale such as the scale 39 may be provided on the casing 64 adjacent the arm 70 to apprise the user of the required setting for said arm to adjust the mirror 61 for different screen distances. It will also be understood that lugs as 53 similar to those shown in Figs. 1 and 2 may be provided on the casing 64 for use in connection with a head band or temples as may be found convenient. It will further be understood that the illustration of Fig. 4 as well as others are intended to be largely diagrammatic and not to scale nor drawn with accuracy, but are intended merely to be illustrative and explanatory of the invention to those skilled in the art.

In Fig. 5, I have shown another embodiment of my invention, similar to the modification of Fig. 4, and employing a fixed mirror 76 and an adjustable mirror 77 mounted within the casing 78. One end 179 of the mirror 77 is pivoted to the end of the lever 79 which is in turn pivotally mounted as at 80. The other end 81 of the mirror 77 is pivoted to the comparatively long link 82 which is pivotally mounted in the casing as at the end 83 thereof. The arm 84 of the lever 79 is comparatively short as compared to the length of the link 82. The edge 179 of the mirror 77 moves in an arcuate path on the operation of the lever 79, while the end 81 of said mirror moves substantially or approximately in a straight line as is shown by the dash-dot center line positions of the parts showing said parts after the adjustment thereof. The picture BC is reflected to the eye 22 through the viewing opening 85, the partition 86 preventing any light from the projected pictures from entering the eye 22 except by reflection. The picture AB, however, is so reflected by the fixed mirror 76 that it does not reach the mirror 77 for reflection to the eye 22 and hence does not enter the eye 22 and is not seen thereby. That is, the leading end edge 81 of the movable mirror is approximately on the line of the ray 58—59 from the point B to the eye 22. Consequently, the unwanted possible image A'B' of the picture AB is eliminated, and the eye 22 sees the picture BC as though it were at B'C'.

The eye 21 sees the projected stereo picture AB directly without any intermediary optical system through the openings 87, 88. The edge 89 of the upright partition 90 limits the field of vision for the eye 21 to the dividing line at B so that BC cannot be seen by the eye 21. The fused stereo image is therefore seen at AB—B'C'. Adjustment of the viewer for various changing conditions is readily effected by movement of the lever 79 in the proper direction while the observer looks through the viewing openings at the projected pictures on the viewing surface.

In Fig. 6, I have shown a simplified form of the device employing the fixed mirror 91 and the movable mirror 92 as the optical system for the eye 22. The operating mechanism for the movable mirror instead of comprising a lever and link system, includes only a lever and slot system with suitable pivots. The eye 21 views one of the projected stereo pictures directly, all view of the other stereo picture being excluded from the eye 21 by the partitions 93 and 94. Similarly, the partition 95 excludes direct view of the other projected stereo picture by the other eye 22, but permits reflection of such picture to said eye by the mirrors. Reflection of said other picture to the eye 22 is also prevented by the arrangement of the leading edge of the movable mirror 92 in the path of the ray from the median line of the twin pictures to said eye as hereinbefore explained. The end 96 of the movable mirror 92 is provided with a pin operating in the straight slot 97, whereby said mirror edge is constrained to move in a straight line path. The other end 98 of the mirror 92 is pivoted to an arm of the bell-crank lever 99 which is pivoted to the casing as at 100. Said end 98 therefore moves in an arcuate path. The mirror 92 is therefore given a motion of rotation and translation on movement of the lever 99 as is shown by the dash-dot center lines of Fig. 6 showing the changed positions of the parts.

Referring now to Fig. 7, I have there shown an instrument wherein two optical systems as in Figs. 1, 2 and 3 are employed, but motions are given to the movable mirrors such as that heretofore described in connection with Figs. 4, 5 and 6, that is, motions of combined translation and rotation. In other words, in place of the direct viewing of one of the projected stereo or twin images by the eye 21 as in the construction of Fig. 5, an optical system substantially identical with that shown in Fig. 5 for the eye 22 is also provided for the eye 21. In this form of the invention, the projected picture AB, seen by reflection only by the eye 21, is moved optically to the position A''B'' while the picture BC reflected only to the eye 22 is moved optically to the position B'C' into coincidence with the image A''B'', thereby to fuse therewith. The unwanted non-stereo images A'B' and B''C'' are excluded by the partitions 101, 102, 103, and 104 of the casing 105. The fixed mirror 106 reflects the picture AB to the movable mirror 107, one end 108 of which is pivoted to the comparatively short lever 109, while the other end 110 of which is pivoted to the comparatively long lever 111. Both levers 109 and 111 are pivotally mounted on the casing 105 as at 112 and 113 respectively.

Similarly, the fixed mirror 114 reflects the picture BC to the movable mirror 115 pivoted at 116 to the short arm 117 of the manually operable lever 118. Said lever is pivoted to the casing at 119. The other end 120 of the mirror is pivoted to the comparatively long lever 121, which is in turn pivoted to the casing at 122. A link 123 connects the lever 118 to the lever 111 to compel simultaneous movement of the mirrors 107 and 115 as a unit, the ends 108, 116 of the mirrors moving in arcs of comparatively short radius and the other ends 110 and 120 of said mirrors moving in arcs of comparatively long radius or, in other words, in respective substantially straight line paths, thereby giving said mirrors the required motion of combined translation and rotation. As hereinbefore explained, the leading edge of each movable mirror cuts off the rays coming from beyond the point B from the non-corresponding eye, so that rays from picture BC cannot reach the eye 21 and rays from picture AB cannot reach the eye 22.

Referring to Fig. 7a, I have there shown a monocular viewer, that is, one adapted for use with one eye only, the other eye being left bare for direct viewing of one of the projected stereo pictures. In this case, the viewer is shown used by the right eye 22, though for use by the left eye, the viewer need merely be turned upside down from the position shown. The mechanism for operating the movable mirror 215 is substantially identical with that shown and described in connection with Figs. 5 and 7, though any suitable mechanism may be employed instead to supply a combined movement of rotation and translation to the movable mirror. As shown, however, the end 220 of the movable mirror 215 is pivoted to the comparatively long lever 221, which is in turn pivoted to the casing 205 at 222.

The fixed mirror 214 reflects one of the projected twin pictures corresponding to the viewing eye to the mirror 215 which is pivoted at 216 to the short arm 217 of the manually operable lever 218, which in turn is pivoted to the casing at 219. The casing walls 201, 202 and 204 exclude the unwanted non-stereo images by preventing the eye 22 from viewing the non-corresponding image either directly or by reflection, the openings 225 and 226 being suitably arranged for that purpose. The interceptor 227 hinged if desired to the wall 202 or 228 serves to mask the other eye or to intercept rays from the non-corresponding twin stereo picture from reaching the bare eye.

In Fig. 8, I have shown a simplified, inexpensive and light form of means for moving the movable reflector 24, thereby permitting the casing 249 to be made comparatively narrow for easy support before the eyes of the user for prolonged periods without fatigue. A straight slot 197 in the casing is provided for one end of the mirror 224 or its holder and an arcuate slot 198 for the other end thereof, suitable pins operating in the slots and moving with the mirror as a unit. The handle 199 serves to move one end of the mirror in the straight slot and to cause the other end to move accordingly in the arcuate slot, thereby imparting the desired adjusting movement of combined rotation and translation to the adjustable mirror. Suitable interceptor partitions 193, 194 and 195 are provided for the purposes hereinbefore explained in detail.

It will be understood that in any of the forms of the invention shown in connection with two optical systems for use with both eyes, one of the systems may be omitted and reliance had solely upon an interceptor as shown for example in Figs. 4, 5 and 6 to exclude the unwanted side image from one eye. It will further be understood that any of the binocular viewers may be made monocular as shown in Fig. 7a by omitting the optical system for one eye and leaving that eye bare to view the corresponding projected picture therefor directly instead of through casing openings or deflectors. It will also be understood that in those cases where the deflector is given a combined motion of translation and rotation, the interceptor may be fixed. In those cases where the deflector is pivoted at one edge, the interceptor is preferably adjustable. In any case, by the use of an adjustable light deflector for one eye and interceptors for both eyes, the objects of the invention have been adequately accomplished and an instrument produced capable of operating efficiently to enable an observer situated angularly or at any reasonable distance from a screen to view contiguous or separated twin or stereo pictures projected in any manner upon a screen without the limitations and disadvantages imposed by the heretofore known methods of polarized filters or colored filters.

While I have shown and described certain specific embodiments of my invention, it will be understood that numerous changes may be made therein, part as hereinbefore indicated and part as will be obvious to those skilled in the art and consequently, I do not wish to be understood as limiting myself to the precise form of the invention disclosed, but intend to claim it as broadly as may be permitted by the state of the prior art and the scope of the appended claims.

I claim:

1. A viewing device for fusing twin stereo pictures comprising a plurality of reflectors, means for varying the relative angular and distance relationship of said reflectors, interceptors coupled with the reflectors and arranged in the path of the light from said pictures to the eyes of the user to bring the twin stereo pictures into optical superposition for stereopsis and to limit the field of view to the optically superimposed stereo images and means for simultaneously adjusting the reflectors and interceptors in a single operation.

2. A binocular device for fusing twin stereo pictures projected in lateral juxtaposition on the screen, said device including fixed reflectors, cooperating movable reflectors, fixed interceptors and movable interceptors, and means for simultaneously adjusting the movable reflectors and interceptors to bring the twin stereo images seen by the user into optical superposition for stereopsis and to limit the field of view to the optically superimposed stereo images.

3. A binocular device for viewing projected non-overlapping twin stereo pictures, including two sets of reflectors, coupled means for varying the relative angular relationship of the reflectors in each set to superimpose the respective eye images of the pictures, and interconnected coupled interceptors for limiting the field of view of the device to the optically superposed images.

4. A device for fusing projected twin stereo pictures, including two cooperating reflectors, fixed interceptor partitions, and means for giving one of said reflectors a combined predeterminedly inter-related and simultaneous motion of rotation and translation so that the varying positions of said movable reflector relatively to said partitions limit the resultant field of view to optically superimposed stereo images, said means comprising spaced pins on said one reflector, and means for guiding and constraining said pins to move along predetermined approximately linear paths in the same general direction.

5. A binocular device for fusing twin stereo pictures projected on a screen, including paired optical systems, means for varying the relative lateral optical deflections of said systems, and means including light interceptors coupled with said deflection varying means and movable simultaneously therewith to limit the resultant field of view to the optically super-imposed stereo pictures.

6. In a viewer for fusing twin stereo pictures projected in non-overlapping relation on a viewing surface, means to deflect the light from at least one of the pictures to superimpose its image as seen by one eye of the user through the viewer optically on the other picture as seen by the other eye, including a fixed reflector and a movable reflector, means for adjusting the movable deflector to vary the angle of light deflection thereof and thereby to produce stereopsis, hypo-stereopsis and hyper-stereopsis, and opaque interceptor means for excluding from each of the eyes the non-corresponding one of said twin pictures, the leading edge of the movable reflector being arranged approximately on the line of the light ray from the inner edge of the corresponding twin picture.

7. In a viewer for fusing twin stereo pictures projected in edge to edge contiguous relation on a viewing surface with adjacent edges of said pictures coincident to form a common edge, means including a movable reflector to deflect light from one of said pictures toward a corresponding eye of the user, means for moving the reflector to optically superimpose the image of one picture as seen by the corresponding eye through the viewer upon the other picture as seen by the other eye, and opaque interceptor means to exclude the light of each picture from the non-corresponding eye of the user, the outer end edge of the reflector, said edge being nearest the pictures, being arranged approximately on the line of the ray from said common edge of the twin pictures to said corresponding eye, and said reflector and interceptor means cooperating to limit the field of vision of said viewer to the area of the fused pictures.

8. In a stereoscopic optical instrument, a casing provided with a light entrance opening and with a light exit opening, fixed light intercepting walls on the casing cooperating with at least one of the openings to intercept the light from one of a pair of twin images, a pair of cooperating reflectors within the casing, one of the reflectors being movable, means for moving the movable reflector including a member arranged partly within and partly beyond the casing, said member being manually operable, and means for constraining the movable reflector to move in a combined rotary and translatory path comprising a first elongated guide wall on the casing in operative engagement with one selected point of the movable reflector and a second guide wall on the casing non-parallel to and in spaced relation to the first guide wall and in operative engagement with a second selected point of the movable reflector.

9. In a stereoscopic optical instrument, a casing, a front wall on the casing having a first opening and a second opening longitudinally spaced from the first opening, a rear wall having a third opening aligned with the first opening and having a fourth opening out of transverse alignment with the second opening, said casing having a longitudinally arranged slot therein and having a curved slot spaced longitudinally and transversely from the linear slot, a partition in the casing extending from the front to the rear wall and separating the first and third openings from the second and fourth openings, said slots being arranged on the same side of the partition, a fixed reflector on the same side of the partition as said slots and in operative relation to the second opening, a movable reflector in operative relation to the fixed reflector and to the fourth opening, means operatively connected to the movable reflector and entering the slots to guide the movable reflector in its movement, and a manually operable member connected to the last-mentioned means and extending partly within and partly outside of the casing.

10. A binocular device for viewing projected non-overlapping twin stereo pictures, comprising a fixed reflector, a movable reflector, means for guiding and controlling the movement of the movable reflector to impart thereto a single predetermined movement of combined and inter-related translation and rotation, said means including a first guiding element for one selected point of the reflector, a second guiding element for a second selected point of the reflector, said second element being in non-parallel spaced relation to the first element and a manually movable member connected to the movable reflector, and fixed means for limiting the resultant field of view of the device to the optically superimposed images of said pictures.

11. In a viewer for use by a member of an audience to optically fuse non-overlapping twin stereo pictures projected on a viewing surface and thereby to obtain stereopsis, a reflector, an interceptor arranged in the path of light from the pictures to the reflector, and means for adjusting the position of the reflector relatively to the interceptor to limit the field of view of said viewer to the optically fused pictures, said means comprising a manually movable member connected to the reflector, and means for supporting and guiding selected spaced points of the reflector to constrain said points to move in different predetermined non-parallel paths on the movement of the member.

12. In a stereoscopic optical instrument, a casing, said casing having a pair of non-parallel slots therein, a movable reflector within the casing, means engaging the reflector and entering said slots for guiding the reflector in its movement, and manually operable means for moving the reflector.

13. In a stereoscopic optical instrument, a movable reflector, a pair of non-parallel guides in operative engagement with spaced points of the reflector, and a manually operable member connected to the reflector for moving the reflector, said guides constraining the reflector to move only in a movement of combined rotation and translation, said translatory and rotational movements having a predetermined inter-relation.

14. In a stereoscopic optical instrument, a fixed reflector, a movable reflector, a support for the movable reflector, a pair of pins carried by the support in fixed spaced relation to each other and pin-moving and guiding elements engaging at least one of the pins, and operative to move said one of the pins along a predetermined curvilinear path and controlling the movement of the other of said pins about a predetermined path during the movement of said one of the pins.

15. In a stereoscopic optical instrument, a reflector, an interceptor arranged in the path of light directed to the reflector, and means for adjusting the position of the reflector relatively to the interceptor, said means comprising a manually movable member connected to the reflector, and means for supporting and guiding selected spaced points of the reflector to constrain said points to move in predetermined approximately linear paths in the same general direction on the movement of the member.

16. In a stereoscopic optical instrument, a casing, a movable reflector, a support for the reflector in the casing, and a pair of spaced elongated links controlling the movement of the support, each of said links being pivoted at a first point to the support and being pivoted to the casing at a second point in spaced relation to the first point.

17. In a stereoscopic optical instrument, a movable reflector element including a support, a first pin on the element, a second pin on the element in fixed spaced relation to the first pin, an operating handle having an operative connection with the element, and guiding and controlling means determining the movement of the element, said means engaging at least one of the pins and constraining said one of the pins to move along a predetermined approximately linear path on the movement of the handle while maintaining the fixed spaced relation of said pins.

18. In a stereoscopic optical instrument, a casing, a pair of cooperating reflectors within the casing, one of said reflectors being movable, means for moving the movable reflector including a manually operable element arranged partly within and partly outside of the casing, and means for constraining the movable reflector to move bodily in a curvilinear path about a distant axis, said constraining means comprising a support for the reflector, pins at selected spaced apart points of the support, and constraining elements on the casing to guide the pins along predetermined approximately linear paths.

DAVID B. STEINMAN.